(12) United States Patent
Kondo

(10) Patent No.: US 7,007,901 B2
(45) Date of Patent: Mar. 7, 2006

(54) MICROPHONE SUPPORT

(75) Inventor: Kazuhisa Kondo, Machido (JP)

(73) Assignee: Kabushiki Kaisha Audio-Technica, Tokyo (JP)

( * ) Notice: Subject to any disclaimer, the term of this patent is extended or adjusted under 35 U.S.C. 154(b) by 140 days.

(21) Appl. No.: 10/713,371

(22) Filed: Nov. 14, 2003

(65) Prior Publication Data

US 2004/0195469 A1    Oct. 7, 2004

(30) Foreign Application Priority Data

Nov. 20, 2002   (JP)   ................ 2002-336312

(51) Int. Cl.
   *A47F 5/00*   (2006.01)

(52) U.S. Cl. .......... 248/75; 248/288.51; 248/516; 403/131; 403/123; 403/122

(58) Field of Classification Search .......... 248/288.31, 248/663, 664, 161, 406.1, 157, 418, 415, 248/181.1, 206.2, 206.3, 125.8, 414, 60, 248/317, 604, 610, 481, 288, 288.51, 516; D14/225; 403/131, 123, 122
See application file for complete search history.

(56) References Cited

U.S. PATENT DOCUMENTS

| 1,509,068 | A | * | 9/1924 | Herron .................. 248/181.1 |
| D176,069 | S | * | 11/1955 | Kamp ...................... D14/229 |
| 2,901,552 | A | * | 8/1959 | Geloso ..................... 381/363 |
| 3,153,123 | A | * | 10/1964 | Harman .................... 381/363 |
| 4,853,965 | A | * | 8/1989 | Blonski .................... 381/363 |
| 5,805,709 | A | * | 9/1998 | Liou ....................... 381/361 |

FOREIGN PATENT DOCUMENTS

JP          11-341576         12/1999

* cited by examiner

*Primary Examiner*—Robert P. Olszewski
*Assistant Examiner*—Todd M. Epps
(74) *Attorney, Agent, or Firm*—Welsh & Katz, Ltd.

(57) ABSTRACT

The present invention provides a microphone support which includes a restriction groove 520 between a universal ball 50 and a mounting member 70 in order to restrict the rotating angle range of the universal ball 50 rotating with the axis line of a pipe through-hole 510 centered, so that the direction axis L of a microphone is restricted to have a designated swinging angle range with the talker side of the microphone centered. Therefore, no breaking wire by wire-twists is generated, and since the microphone is prevented from facing to loudspeakers owing to careless handling, no howling is also generated.

3 Claims, 4 Drawing Sheets

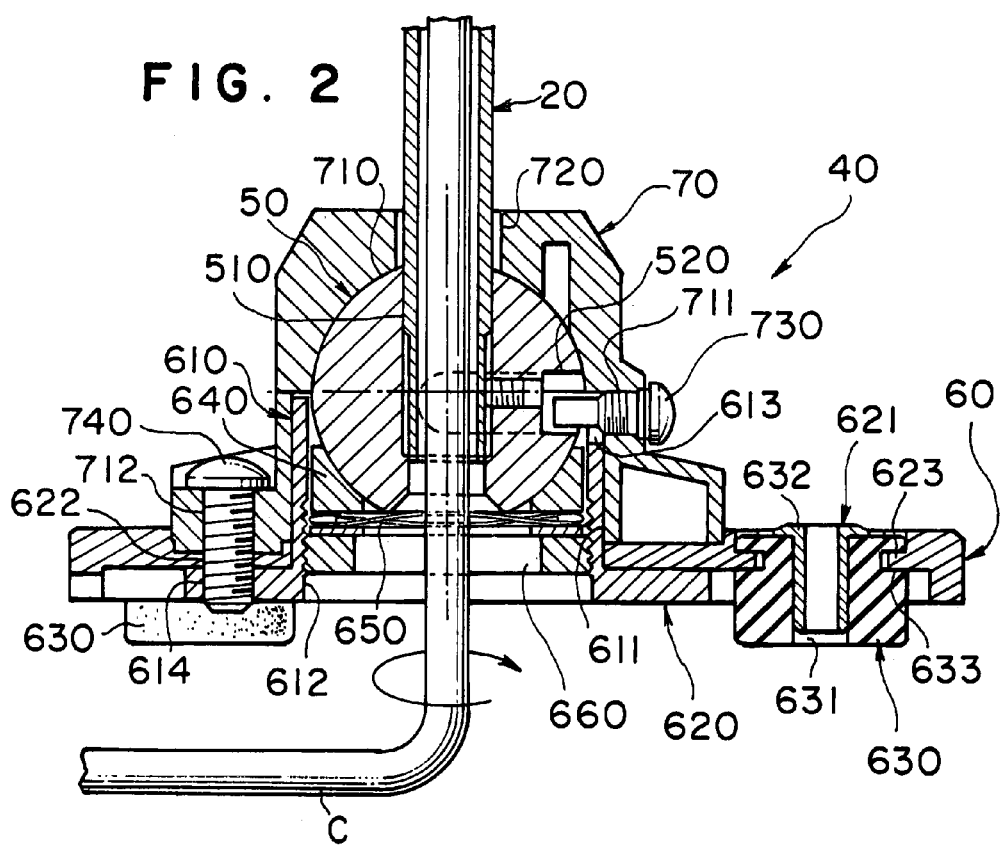
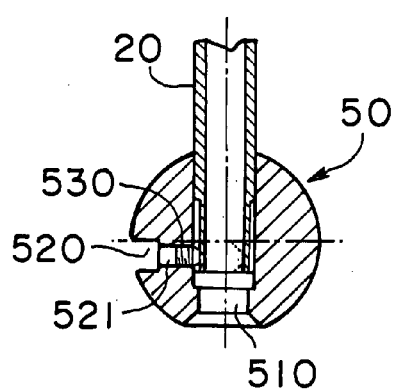
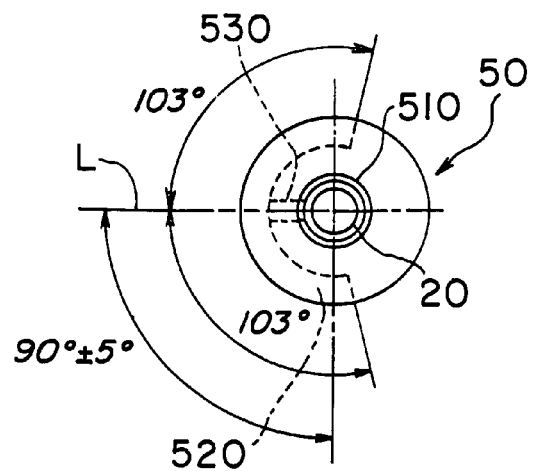

MICROPHONE SUPPORT

FIELD OF THE INVENTION

The present invention relates to a microphone support which may adjust an angle or a direction of a microphone mounted on a desk in a conference room. Particularly, the present invention relates to a microphone support which hardly generates breaking of wire or howling generated by a position-adjustment of a microphone.

BACKGROUND OF THE INVENTION

A lavalier microphone worn in a breast portion of a talker's jacket, a boundary microphone put on a table or a gooseneck microphone directly fixed on a desk or a table is used as a microphone in a conference room and so on.

One aspect of a gooseneck microphone is illustrated in FIG. 6. In this microphone 1, a microphone unit 2 is mounted on one end of a supporting pipe 4, while the other end of the supporting pipe has a XLRM type female connector and so on. One portion of the supporting pipe 4 includes a flexible shaft 41.

This microphone 1 is inserted to a connector (a male connector in FIG. 6) mounted on a mounted member such as a table which is not shown, then the microphone is easily set on a desk. The flexible shaft 41 is bent by a talker, so that the microphone is adjusted to the position where the talker likes to move the microphone.

However, since the flexible shaft 41 is formed like a pipe with two metallic wires spirally wound alternately, the shaft 41 has no durability, and an active forth of the flexible shaft is varied with time, as well as an unusual sound occurs when the shaft is bent. The flexible shaft 41 is expensive owing to it's complex structure This applicant proposed a microphone stand in which the position of the microphone is adjusted to move steplessly by using a universal ball instead of the flexible shaft 41 in Japanese Patent Application Laid-open No. 11-341576. According this microphone stand, since a supporting pipe may be moved almost omnidirectionally through the universal ball, the microphone may be faced to any direction.

However, since the universal ball is rotatable, the following problems happen. The cable of the microphone is extracted through the inside of the supporting pipe, then, when the pipe continues being revolved in the same direction, or is reciprocatively repetitively resolved in a wide angle range, since the microphone cable is twisted, the cable will be broken.

A loudspeaker which louden the voice of a talker is provided in a conference room and so on. When a microphone is faced to a loudspeaker, howling is generated.

SUMMARY OF THE INVENTION

The present invention solves the problems described above. it is, therefore, an object of the present invention that a microphone support which has no breaking wire owing to wire-twists is provided. It is another object of the invention that a microphone support of which the microphone is prevented from facing to a loudspeaker owing to careless handling is provided.

A microphone support of this invention includes a supporting pipe on the tip of which a microphone is mounted and a universal ball having a pipe through-hole penetrating the supporting pipe. The support also includes a base frame fixed on a mounted member such as a table and so on. The base frame has a mounting member in which the universal ball is ratatably supported. The microphone is adjusted to move through the universal ball to any position including an angle and a direction of the microphone, and a microphone cable is extracted through the supporting pipe and the pipe through-hole of the universal ball. In the microphone support, a rotation-restriction means which restricts a rotating angle range of the universal ball with the axis line of the pipe through-hole centered is provided between the universal ball and the mounting member. Because of the rotation-restriction means, a swinging angle range of the microphone directional axis is restricted in order to revolve within a designated angle range with the talker side of the microphone centered.

According to this invention, the directional axis of the microphone is adjusted to move to any position according to that of a talker's mouth, and as well as the swinging angle range of the microphone is restricted, So that no breaking of the cable or no howling is generated.

A unidirectional microphone is usually used as a microphone for a meeting and loud speakers are positioned in front of a talker. One microphone is often shared with a plurality of talkers. It is preferable that the swinging angle range viewed from a talker is under ±110 degrees not so as to generate no howling.

From the viewpoints of productivity and assembling, it is preferable that the rotation-restriction means includes a restriction groove which is formed along the outer surface of the universal ball and a restriction boss projected to the restriction groove.

Since a screw type-fixing member is provided on the bottom of the restriction groove in order to fix the supporting pipe to the pipe through-hole, the length of the supporting pipe (the height of the microphone) is easy fixed

BRIEF DESCRIPTION OF THE DRAWINGS

FIG. 2 is a fragmentary sectional view of the microphone support relating to an embodiment of the present invention.

FIGS. 3a and 3b are, respectively, a sectional view and a plane view, to illustrate the structure of the universal ball.

DETAILED DESCRIPTION OF THE PREFERRED EMBODIMENTS

Figure 1:
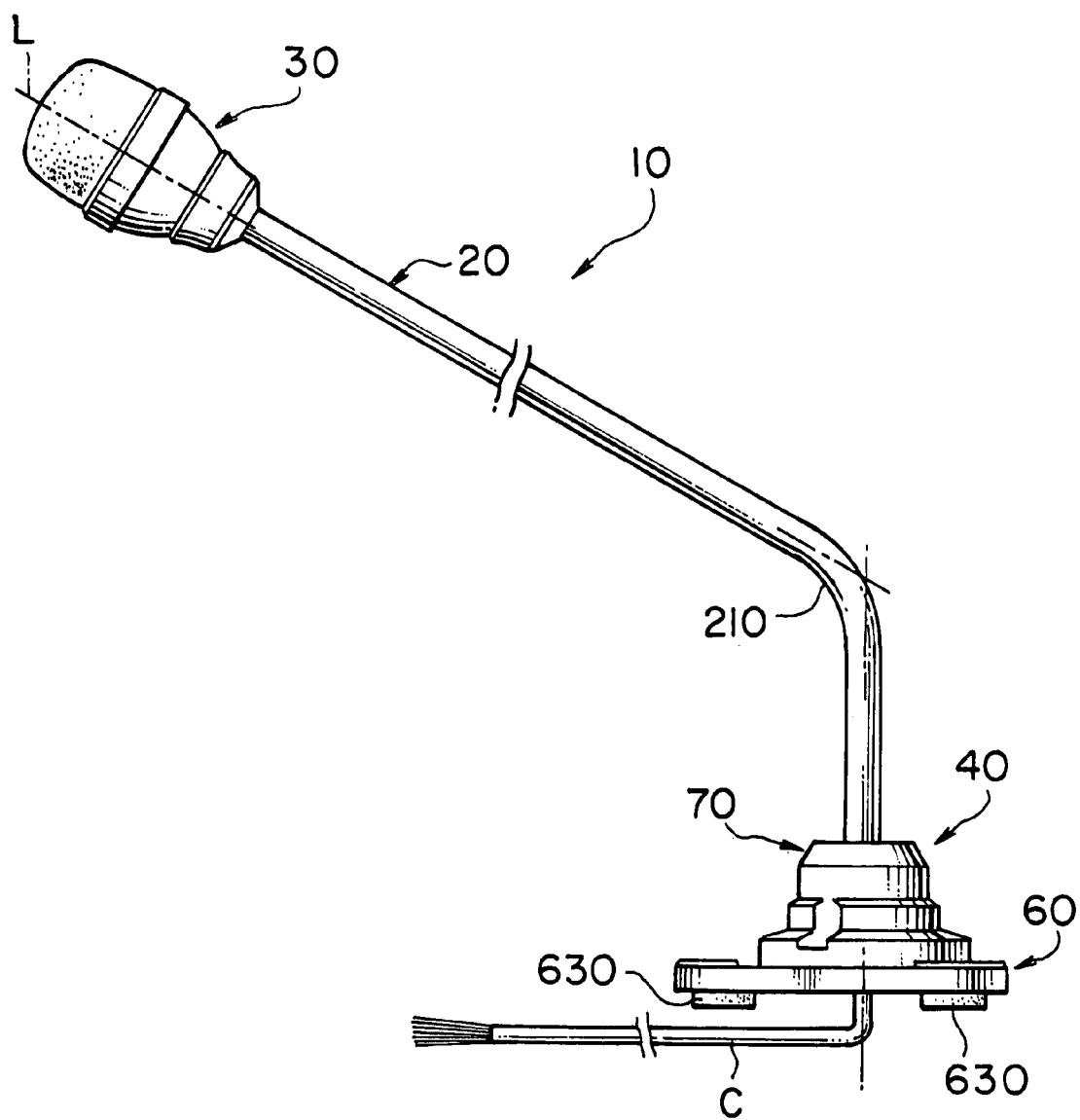
FIG. 1 is a side view of a microphone support relating to an embodiment of the present invention.

An embodiment of the present invention will be described referring to drawings. FIG. 1 is a side view of a microphone support relating to the embodiment of the invention. FIG. 2 is a sectional view of a base frame of the microphone support.

The microphone support 10 includes a supporting pipe 20 having a microphone 30 on the tip of the pipe 20 and a base frame 40 fixed on a mounted member such as a desk (not shown). The support 10 also includes a universal ball 50 rotatably accommodated in the base frame 40 with the rear end of the supporting pipe 20 supported in the universal ball 50.

A microphone 30, which is unidirectional, is mounted on the tip of the supporting pipe 20 with the directional axis L of the microphone 30 coaxially aligning to the axis of the pipe 20.

Either resin or metal is used for the material of the supporting pipe 20. In this embodiment, the pipe 20 is elbowed-bent at one portion of the same. A bending porting 210 has a folding angle of approximately 120 degrees in this embodiment, however, the folding angle of the bending portion 210 is free-designed according to it's specifications.

As shown in FIG. 2, a cable C connected to the microphone 30 is wired in the supporting pipe 20. The other end of the cable C is connected to an audio instrument, which is not shown, such as an amplifier or an audio mixer and so on.

The other end of the supporting pipe 20 is mounted to a universal ball 50, which is made from metal such as stainless steel. A pipe through-hole 510 penetrating and holding the supporting pipe 20 is included in the universal ball 50 as shown in a sectional view of FIG. 3a and a plane view of FIG. 3b.

The pipe through-hole 510 has a through-hole penetrating along the direction of a diameter of the universal ball (upper and lower direction in FIG. 3a). The through-hole 510 preferably has a bore diameter such that no looseness between the hole 510 and the supporting pipe 20 is generated.

The outer surface of the universal ball 50 includes a restriction groove 520, which restricts a rotation range of the ball 50 together with a restriction boss 730 mounted on a base frame 40. In the bottom of the restriction groove 520, an internal thread hole 530, which is screwed together with a fixing member 521, is formed as a pipe-movement-restriction means appearing toward the pipe through-hole 510.

The restriction groove 520 is circularly formed with the axis line of the pipe through-hole 510 centered. As shown in FIG. 3b, the groove has a symmetrical right and left swinging angle range with the directional axis L (a talker) of the microphone 30 centered.

The swinging angle range of the restriction groove 520 is determined by the relation between the unidirectional characteristics of the microphone 30 and, for example, loud speakers (not shown) positioned in front of a talker. Further, the swinging angle range has preferably the angle in which no howling is generated.

The swinging angle range is usually approximately ±30 degrees, respectively, right and left, with the directional axis of the microphone 30 L centered. In this sample, the swinging angle range is under ±110 degrees, respectively, right and left, with the directional axis of the microphone 30 L centered, since it is considered that one of the microphone 30 may be shared with a plurality of talkers. In the embodiment, the swinging angle range is formed in+100 degrees, respectively, right and left, that is, as the total is 200 degrees. However, the swinging angle range of the restriction groove 520 may be right-and-left-nonsymmetrical, if the above condition of the range is provided.

An internal thread hole 530 is penetrated at approximately right angle in relation to the pipe through-hole 510. In the inside of the hole 530, an internal thread is formed with the fixing member 521 advancing or retreating. The fixing member 521 includes a set screw screwed with the internal thread hole 530. The member 521 presses one portion of the supporting pipe 20 and restricts the movement of the pipe 20 by appearing toward the pipe through-hole 510.

As shown in FIG. 2, the base frame 40 includes a pedestal plate 60 fixed on the mounted member such as a desk and so on, which is not shown, and also includes a mounting member 70, which is screwed on the upper portion of the pedestal plate 60 and rotatablly accommodates the universal ball 50 in the mounting member. In this embodiment, the pedestal plate 60 and the mounting member 70 are metallic cutting products.

Figure 4A:
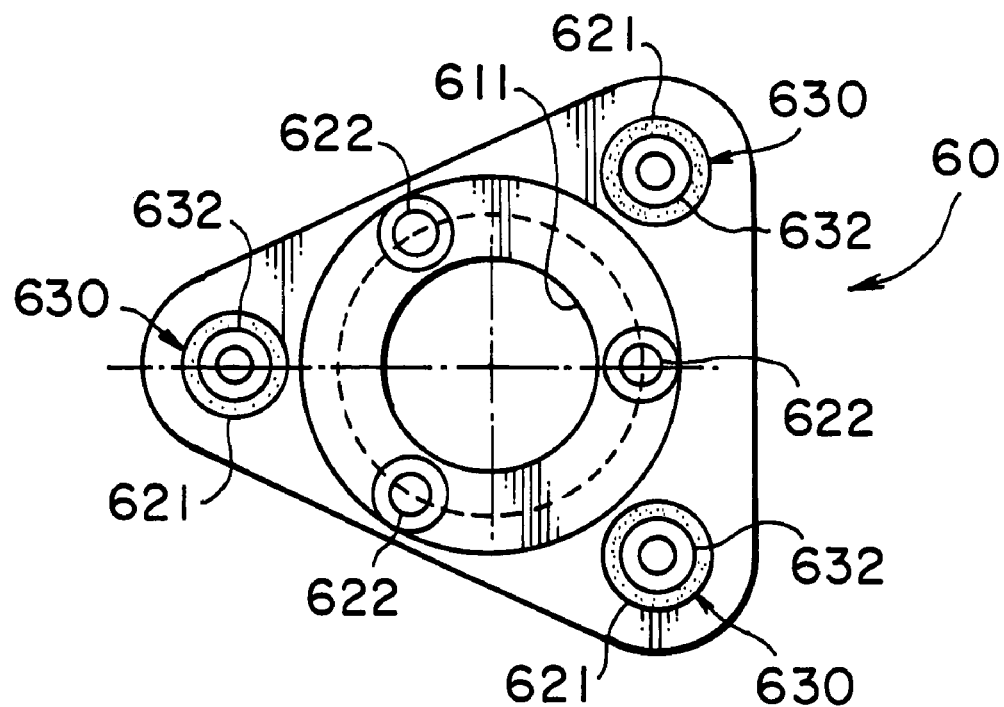
FIGS. 4a and 4b are, respectively, a plane view and a sectional view, to illustrate the structure of the pedestal plate.
Figure 4B:
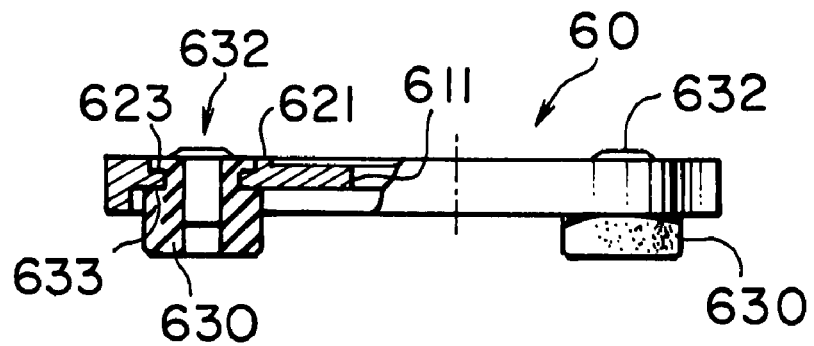

As shown in FIGS. 4a and 4b, in this embodiment the pedestal plate 60 is formed in the plate-shape of an isosceles triangle. An opening 611, with which a cylindrical sleeve 610 inserted to the inside of the mounting member 70 is fit, is formed in the approximate center of the plate 60. The pedestal plate 60 is put on the mounted member such as a desk with the vertex positioned at left side in FIG. 4a facing toward a talker.

The each of the vertexes of the pedestal plate 60 has a mounting hole 621 to mount a rubber bush 630 as a fixing foot to a mounted member which is not shown. An annular projection 623, with which a latching groove 633 of the rubber bush 630 is latched in the mounting hole 621, is projected toward the center of the mounting hole 621.

The rubber bush 630 includes a cylindrical member and the center of the rubber bush includes a inserting hole 631 to insert a mouth piece 632. The annular latching groove 633 is provided coaxially with the axis line of the inserting hole 631 in the outer circumference of the rubber bush 630. The latching groove 633 is latched along the annular projection 623 of the mounting hole 621. The diameter of the upper flange of the mouth piece 632 is smaller than the bore diameter of the annular projection 623.

When the rubber bush 630 is assembled in the pedestal plate 60, first, the rubber bush 630 is inserted to the mounting hole 621 and the annular projection 623 is latched in the latching groove 633. Then, the mouth piece 632 is inserted in the inserting hole 631 of the rubber bush 630, so that the mouth piece 632 broadens the bore diameter of the inserting hole 631, and the rubber bush 630 is tightly fixed to the pedestal plate 60.

The pedestal plate 60 is fixed to the mounted member by screws (not shown). Each of screws is penetrated through the mouth piece 632. Since the diameter of the upper flange of the mouth piece 632 is smaller than the diameter of the annular projection 623, when large force is added to the microphone 30 or the supporting pipe 20, release of the rubber bush 630 from the mounting hole 621 of the pedestal plate 60 prevents the microphone 30 or the supporting pipe 20 from being damaged.

The pedestal plate 60 also includes screw holes 622. Each of the screw holes 622 is screwed together with a fixing screw 740, when the mounting member 70 is fixed. In this embodiment, the total number of the screw holes 622 are three, which are arranged with each other in 120 degrees on a concentric circle and each of the screw holes 622 is positioned between one and another mounting hole 621.

As shown in FIG. 2, the sleeve 610 is inserted from the lower portion of the pedestal plate 60 and fit in the opening 611 of the pedestal plate. A flange having sleeve-internal thread holes 614, each of which is fit with each of the screw holes 622 of a fixing plate 620, is formed at the lower portion of the sleeve 610. The sleeve 610 is fixed on the lower face of the fixing plate 620 with the fixing screw 740.

A screwed face 612, with which a fixing nut 660 (described hereinafter) is screwed, is provided at one bottom portion of the sleeve 610. A cutout 613 which is semi-circularly cut is provided at one upper portion of the sleeve 610. The tip of the restriction boss 730, which is described hereinafter, is inserted to the cutout.

Figure 5A:
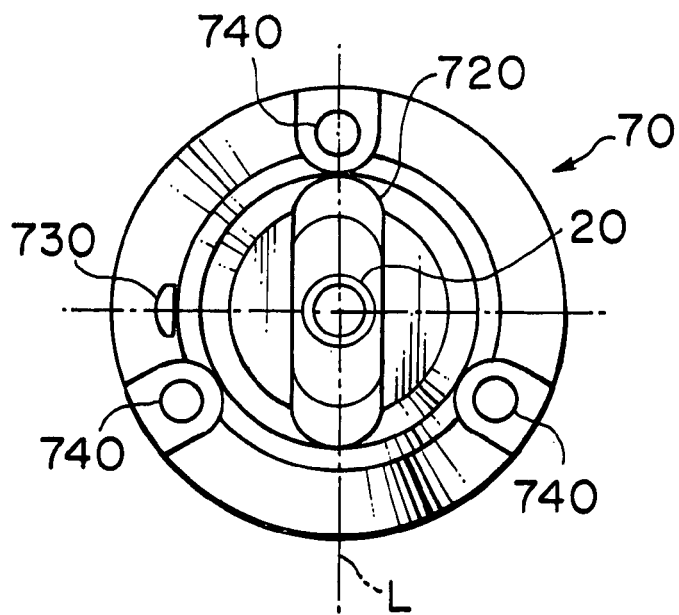
FIGS. 5a and 5b are, respectively, a plane view and a partially sectional view, to illustrate the structure of the mounting member.
Figure 5B:
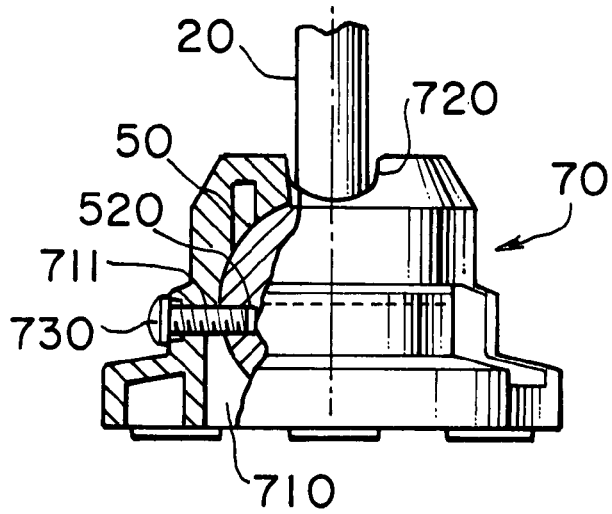
Figure 6:
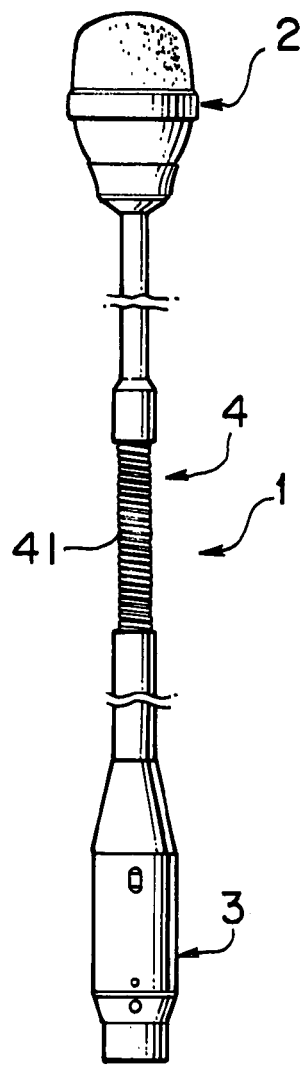
FIG. 6 is a front view of a conventional microphone support.

Referring to FIGS. 2, 5a and 5b, the mounting member 70 includes an accommodating portion 710 in which the universal ball 50 is able to be accommodated. An extracting hole 720 opens on the upper face of the mounting member 70 to extract the supporting pipe 20. The upper face of the inner surface of the accommodating portion 710 is formed circularly along the surface of the universal ball 50.

As shown in FIG. 5a, the extracting hole 720 is formed such that the shape of the hole 720 is prolate ellipsoidal and the prolate axis of the hole 720 is parallel to the directional axis L of the microphone 30. Then, the supporting pipe 20 is able to incline only back and forth (in FIG. 5a, upper and lower) by a designated angle.

A screw hole 711 is provided at the side of the mounting member 70. The screw hole 711 is mounted with the restriction boss 730 which appears toward the restriction groove 520 of the universal ball 50. One portion of the surface of the restriction boss 730 includes an external thread which is formed as to be screwed with the screw hole 711. As described above, the rotating angle range of the universal ball 50 is restricted by the tip of the restriction boss projected to the restriction groove 520.

The diameter of the portion near the base of the mounting member 70 broadens like a flange along the pedestal plate 60. A plurality of screw holes 712 are formed and spaced apart with a designated interval on the base of the mounting member 70. Each of the screw holes 712 is screwed with the fixing screw 740. In this embodiment, the total number of the screw holes 712 are tree, which are arranged with each other in 120 degrees on a concentric circle.

In the sleeve 610, a contacting member 640 is included to prevent the universal ball 50 accommodated in the mounting member 70 from slipping out. A spring washer 650 which adequately presses the contacting member 640 upwards is also included. The contacting member and the spring washer are fixed by the fixing nut 660. The shape of the contacting member 640 is disk-and-ring-like, and the contacting face of the contacting member with the universal ball 50 has a circular face of substantially the same curvature as that of the universal ball 50.

When the microphone support 10 is assembled, for example, firstly, the mounting member 70 is put on the upper face of the pedestal plate 60. The sleeve 610 is inserted to the mounting member 70 from the bottom of the member 70. The mounting member 70 and the sleeve 610 are screwed and fixed together with the pedestal plate 60 by three of the fixing screw 740.

At another place, the rear end of the supporting pipe 20, on the tip of which the microphone 30 is not yet mounted, is inserted to the pipe through-hole 510 and is fixed with the fixing member 521. The supporting pipe 20 is passed through the extracting hole 720 and the universal ball 50 is entered in the mounting member 70.

Next, the contacting member 640 and then the spring washer 650 are inserted to the sleeve 610. Then, the fixing nut 660 is gradually tightened up from the bottom of the pedestal plate, so that an adequate friction is generated between the mounting member 70 and the universal ball 50. Then, the restriction boss 730 is screwed from the side of the mounting member 70 and the tip of the boss is positioned within the restriction groove 520 of the universal ball 50 to restrict the rotation angle range of the ball 50. The microphone 30 is mounted on the tip of the supporting pipe at the adequate time.

The supporting pipe 20 moves back and forth along the extracting hole 720 through the universal ball 50 accommodated in the base frame 40. The pipe 20 is revolved within a designated angle range along the restriction groove 520 with the axis line of the pipe through-hole 510 centered, so that the cable C which is wired in the inside of the pipe is not twisted. The microphone 30 is revolved only within a constant swinging angle range with the talker side centered, so that no howling is generated.

In this embodiment, the microphone support 10 is fixed on a mounted member such as a desk through the pedestal plate 60. However, the microphone support may be a movable microphone support with the base frame 40 mounted on a heavy stand, instead of the pedestal plate 60. Such aspects are also included in this invention.

As above-described, according to this invention, the rotation-restricting means is provided between the universal ball and the mounting member to restrict the rotating angle range of the universal ball with the axis line of the pipe penetrating portion of the ball centered. Then, the directional axis of the microphone is restricted to revolve within a designated angle range with a talker centered. So that no breaking of the cable or no howling is generated.

The invention claimed is:

1. A microphone support including a supporting pipe on a distal end of which a microphone is mounted, a universal ball having a pipe through-hole in the center of the universal ball through which an end of the supporting pipe opposite the distal end is penetrated, and a base frame fixed on a surface, the base frame having a mounting member in which the universal ball is rotatably supported, the microphone being adjustable to move to any position including angles and directions of the microphone through the universal ball, a microphone cable passing through the supporting pipe of the universal ball and the supporting pipe passing through the through-hole, the microphone support comprising:

a means for restricting rotation including a restriction groove mounted on a partial circumference of the universal ball and a set screw screwed to a screw hole on the mounting member, the screw hole reaching to the circumference of the universal ball;

the restriction groove formed in the coaxial direction of the through-hole of the universal ball on the partial circumference of the universal ball, the restriction groove having a width in the long direction of the through-hole and a depth in the direction heading from the circumference of the universal ball to the through-hole, the restriction groove further having a right and a left predetermined circumferential length on the circumference of the universal ball from the center of the directional axis of the microphone, wherein one end of the set screw screwed into the screw hole of the mounting member enters the restriction groove; and wherein the set screw entered into the restriction groove restricts the rotational movement of the universal ball to more than a predetermined angle of the universal ball in cooperation with the restriction groove having the right and the left predetermined circumferential lengths.

2. A microphone support according to claim 1 wherein each of the right and the left circumferential lengths of the restriction groove is sufficiently long as to restrict each of the right and left rotational movement more than 110 degrees from the center of the directional axis of the microphone, respectively.

3. A microphone support according to claim 1, wherein a bottom of the restriction groove on the circumference of the universal ball includes an internal thread hole reaching to the through-hole of the universal ball, a fixing member screwed into the internal thread hole fastening the supporting pipe, so that the supporting pipe is fixed in the through-hole of the universal ball.

* * * * *